(12) United States Patent
Iggander et al.

(10) Patent No.: US 12,440,791 B2
(45) Date of Patent: Oct. 14, 2025

(54) AIR FILTER ASSEMBLY WITH IMPROVED LIQUID DRAINAGE

(71) Applicant: Camfil AB, Stockholm (SE)

(72) Inventors: Daniel Iggander, Trosa (SE); Kenny Hedlund, Trosa (SE); Cheah Wei Ng, Ipoh (MY); Muthu Krisnan Mageshvaran, Parit (MY)

(73) Assignee: Camfil AB, Stockholm (SE)

( * ) Notice: Subject to any disclaimer, the term of this patent is extended or adjusted under 35 U.S.C. 154(b) by 577 days.

(21) Appl. No.: 17/619,236

(22) PCT Filed: Jul. 2, 2020

(86) PCT No.: PCT/EP2020/068629
§ 371 (c)(1),
(2) Date: Dec. 14, 2021

(87) PCT Pub. No.: WO2021/001470
PCT Pub. Date: Jan. 7, 2021

(65) Prior Publication Data
US 2022/0241712 A1 Aug. 4, 2022

(30) Foreign Application Priority Data
Jul. 2, 2019 (SE) .................................... 1950829-0

(51) Int. Cl.
*B01D 46/00* (2022.01)
*B01D 46/52* (2006.01)
*B01D 46/58* (2022.01)

(52) U.S. Cl.
CPC ..... *B01D 46/0045* (2013.01); *B01D 46/0002* (2013.01); *B01D 46/0031* (2013.01);
(Continued)

(58) Field of Classification Search
CPC .......................... B01D 46/0045; B01D 46/58; B01D 46/0002; B01D 46/0031; B01D 46/521; B01D 2275/205
(Continued)

(56) References Cited

U.S. PATENT DOCUMENTS

| 4,897,095 A | 1/1990 | Bedi et al. |
| 2003/0009998 A1 | 1/2003 | Watvedt |

(Continued)

FOREIGN PATENT DOCUMENTS

| CN | 102076397 A | 5/2011 |
| CN | 105792911 A | 7/2016 |

(Continued)

OTHER PUBLICATIONS

Particulate air filters for general ventilation—Determination of the filtration performance, Apr. 25, 2012, British Standards Institution, p. 12, 2012 (Year: 2012).*

(Continued)

*Primary Examiner* — Jennifer Dieterle
*Assistant Examiner* — Qianping He
(74) *Attorney, Agent, or Firm* — Patterson + Sheridan, LLP

(57) ABSTRACT

An air filter assembly and use thereof for filtration of air in wet or damp conditions, said air filter assembly comprising: an air filter comprising a front frame defining at least one rectangular aperture for receiving an air flow to be filtered; characterized in that said air filter assembly comprises a deflector element extending alongside edge portion of the rectangular aperture and adapted an to deflect an air flow passing through the rectangular aperture away from an adjacent inside surface of the air filter; and a liquid drain (Continued)

arranged such that liquid collected at said adjacent inside surface of the air filter can exit the air filter through said liquid drain.

19 Claims, 8 Drawing Sheets

(52) U.S. Cl.
 CPC ........... B01D 46/521 (2013.01); B01D 46/58 (2022.01); *B01D 2275/205* (2013.01)
(58) Field of Classification Search
 USPC .......................................................... 55/418
 See application file for complete search history.

(56) References Cited

U.S. PATENT DOCUMENTS

| | | | |
|---|---|---|---|
| 2009/0193773 A1 | 8/2009 | Sundvik et al. | |
| 2010/0015904 A1* | 1/2010 | Yeh .................... | H05K 7/20181 55/511 |
| 2011/0154991 A1 | 6/2011 | Steele et al. | |
| 2013/0023193 A1* | 1/2013 | Hopf .................... | B60H 3/0616 454/158 |
| 2013/0125520 A1* | 5/2013 | Gorman ............ | B01D 46/0002 55/509 |
| 2014/0096493 A1* | 4/2014 | Kelmartin ............... | F02C 7/052 55/482 |
| 2016/0101379 A1 | 4/2016 | Eyers et al. | |
| 2016/0166955 A1* | 6/2016 | Osborne ................ | B01D 46/12 210/483 |
| 2017/0050136 A1 | 2/2017 | Poon et al. | |

FOREIGN PATENT DOCUMENTS

| | | |
|---|---|---|
| CN | 106999821 A | 8/2017 |
| EP | 0888803 A2 | 1/1999 |
| EP | 0888803 B1 | 9/2001 |
| EP | 1970114 A2 | 9/2008 |
| EP | 1970114 B1 | 5/2012 |
| JP | 2013221708 A * | 10/2013 |

OTHER PUBLICATIONS

SE Patent application No. 1950829-0 Swedish Search Report mailed Feb. 11, 2020.
PCT Application No. PCT/EP2020/068629 International Preliminary Report on Patentability mail date May 28, 2021.
PCT Application No. PCT/EP2020/068629, Publication with International Search Report mail date Sep. 11, 2020.
Brazilian Office Action for Application No. BR112021026712-3 dated Jul. 31, 2024.

* cited by examiner

AIR FILTER ASSEMBLY WITH IMPROVED LIQUID DRAINAGE

FIELD OF THE INVENTION

The present invention relates generally to air filter assemblies, and more specifically to air filter assemblies for use in wet or damp environments where substantial amounts of water will be separated from the incoming air. Examples of applications include inlet filters to gas turbines used for power supply at oil platforms, as well as of course other filters that are used on oil platforms, ships, etc.

BACKGROUND OF THE INVENTION

Air filter assemblies comprising filter elements disposed in a frame structure are known. Examples include, panel filters, deep pleat box filters and V-type filters. A panel filter or a deep pleat box filter typically comprises a pleated filter element arranged in a rectangular or box-like frame. A V-type filter typically includes two or more pairs of pleated filter elements arranged in a V-configuration. Common to all three types of filters are that they comprise a rectangular aperture at the open end for receiving an air flow to be filtered into a space upstream of the filter element(s).

Each of the filter elements may be comprised of a pleated particulate or gas filter element. A filter element is typically formed from a sheet of filter media, e.g. a fiberglass sheet, or a nonwoven polyester sheet or membrane media or combinations thereof or the like, which is pleated to increase the effective filtering area of the filter body. The filter media for particle separation has the specific ability to remove particles of different sizes from the air stream depending on the media type and will by that typically conform to a filtration class from G4 up to H13 according to the standards EN779 or EN 1822 or by equivalent other national or international standards. A filter media for molecular filtration have similarly a specific ability to remove different types of gaseous compounds from the air stream. The gaseous compounds removed depend on the media type.

To provide mechanical support and/or to combine a plurality of filter elements, the filter elements are typically arranged in a frame structure. In order to secure the filter elements to the frame structure and prevent air from bypassing the filter elements, the filter elements are typically adhered and sealed against the frame structure by means of an adhesive.

The air filter assemblies are typically mounted in a filter holding structure. The filter holding structure may for example comprise a filter housing or filter bank grid, with one or more openings in which the filter assemblies are fitted.

Air filter assemblies are employed in a wide range of applications, from filtration of intake air in building ventilation systems to filtration of intake air for large-scale industrial facilities and equipment. One important application for V-type filter assemblies is as air intake filters in connection with gas turbine combustion systems employed for power generation. In such applications, high volumes of air are utilized in the combustion process. In turn, high volume air filtration is required to condition intake air streams for combustion optimization and for reducing wear on gas turbine components. In particular, the removal of relatively small particles and liquid is important to minimize degradation of turbine compressor blades leading to loss of compressor efficiency.

When using filters with a high degree of separation, as required for example for gas turbine applications, in wet or damp environments, substantial amounts of water will be separated from the incoming air. Examples of applications where this may be an issue include inlet filters to gas turbines used for power supply at oil platforms, as well as of course other filters that are used on oil platforms, ships, etc.

In order to prevent excessive build-up of water on the pleated filter media, the air filter assemblies are typically mounted with the filter elements arranged in a vertical orientation, allowing water to drain from the media surface down to the bottom of the frame structure by force of gravity. Water collected at the bottom of the frame structure is then expected to drain out through the open end of the filter.

In some cases, attempts to improve water drainage have included providing the bottom of the frame structure with an incline, such that liquid collected at said adjacent inside surface will be urged by force of gravity towards the open end of the air filter. However, such modification of the bottom of the frame structure will typically have to be made at the expense of a reduction of the available filter media area, leading to an increase in pressure drop.

When an air filter is used in wet or damp conditions, e.g. with sea spray or heavy rain going in the filter, water can build up in the bottom frame structure. Due to the air flow passing through the filter, particularly in high volume air filtration applications, the water collected at the bottom of the frame structure is prevented from draining out through the open end of the filter. In high gas flow applications, such as in gas turbine systems, the water build-up can be as high as 2 cm. This amount of water causes the filter media to soak, weakening the media and making it susceptible to damage and leaks. In marine environments, the soaking of the media can allow saltwater to leak through the filter causing damage to the turbine blades by high temperature corrosion. Additionally, the water build-up will effectively reduce the available filter media area, leading to an increase in pressure drop.

SUMMARY OF THE INVENTION

One object of the present disclosure is to provide an air filter or an air filter assembly, which solves or ameliorates at least some of the problems associated with prior art air filters for use in wet or damp conditions.

Another object of the present disclosure is to provide an air filter or an air filter assembly, suitable for use in wet or damp conditions.

The above objects as well as other objects that will become apparent to the skilled person in the light of the present disclosure are achieved by the various aspects of the invention as set out herein.

According to a first aspect of the disclosure, there is provided an air filter assembly comprising:
  an air filter comprising a front frame defining at least one rectangular aperture for receiving an air flow to be filtered;
  characterized in that said air filter assembly comprises
  a deflector element extending alongside an edge portion of the rectangular aperture and adapted to deflect an air flow passing through the rectangular aperture away from an adjacent inside surface of the air filter; and
  a liquid drain arranged such that liquid collected at said adjacent inside surface of the air filter can exit the air filter through said liquid drain. The liquid drain is preferably arranged between said deflector element and said edge portion of the rectangular aperture, such that liquid collected at said adjacent inside surface of the air filter can exit the air filter through said liquid drain.

The air filter typically comprises at least one filter element, preferably a rectangular pleated filter element, and a filter frame having the filter element(s) disposed therein.

When in use, the air filters are typically mounted in a vertical filter holding structure such that the rectangular (e.g. quadratic) aperture(s) for receiving the air flow to be filtered are vertical. The filter holding structure may for example comprise a filter housing or filter bank grid, with one or more openings in which the filter(s) are fitted.

In some embodiments, the air filter is a panel filter, a deep pleat box filter, or a V-type filter. A panel filter or a deep pleat box filter typically comprises a pleated filter element arranged in a rectangular or box-like frame. A V-type filter typically includes two or more pairs of pleated filter elements arranged in a V-configuration.

The air filter has the specific ability to remove particles, including water droplets, of different sizes from the air stream. Air filters can be classified on the basis of their filtration efficiency measured under defined standard conditions in relation to a defined test dust or aerosol. According to the standards EN779 and EN 1822, air filters are categorized in the filter classes G1, G2, G3, G4, M5, M6, F7, F8, F9, E10, E11, E12, H13, H14, U15, U16, and U17 with increasing filtration efficiency. In some embodiments, the air filter conforms to a filtration class from G4 up to H13 according to the standards EN779 or EN 1822 or equivalent other national or international standards. In some embodiments, the air filter conforms to a filtration class from F7 up to H13 according to the standards EN779 or EN 1822 or equivalent other national or international standards. In some embodiments, the air filter conforms to a filtration class from F9 up to H13 according to the standards EN779 or EN 1822 or equivalent other national or international standards. In some embodiments, the air filter conforms to a filtration class from E10 up to H13 according to the standards EN779 or EN 1822 or equivalent other national or international standards. In some embodiments, the air filter conforms to a filtration class from ePM10 up to ePM1 according to the international standard ISO16890.

Filters according to these filtration classes will typically also remove water droplets present in the air stream. In some embodiments, the filter media of the air filter is impermeable or substantially impermeable to water droplets present in the air stream. Because the filter media is impermeable or substantially impermeable to water droplets a substantial amount of water will remain on the upstream side of the media when the filter is operated in wet or damp conditions.

In some embodiments, the filter element(s) of the air filter are formed of a filter media which does not absorb water, or which only absorbs water to a very low extent. In some embodiments, the filter element(s) of the air filter are formed of a filter media which is hydrophobic. In some embodiments, the filter element(s) of the air filter are formed of a filter media which has high resistance to water penetration. The resistance to water penetration of a filter media may be measured in pascal (Pa) according to the standard EN20811 or ISO811. In some embodiments, the filter media of the filter element(s) has a resistance to water penetration of at least 3000 Pa, at least 4000 Pa, at least 5000 Pa, or at least 6000 Pa, as determined according to the standard EN20811 or ISO811.

In some embodiments, the air filter is a panel filter or a deep pleat box filter comprising:
a rectangular pleated filter element; and
a rectangular filter frame having the pleated filter element disposed therein, said filter frame comprising a first pair of opposing side plates sealed to the pleated edges of the rectangular pleated filter element and a second pair of opposing side plates sealed to the non-pleated edges of the rectangular pleated filter element, said rectangular filter frame forming a front frame defining a rectangular aperture at the open end for receiving an air flow to be filtered.

V-type air filter frames typically comprise two opposing side plates and a front frame and a rear plate connected to the side plates. The V-type filter frames are configured to house one or more pairs of rectangular filter elements, each pair forming a V-shape, such that the open end, or mouth, of the V-shape faces the front frame. The front frame, possibly together with the side plates, define at least one rectangular aperture at the open end of a pair of filter elements.

In some embodiments, the air filter is a V-type filter comprising:
at least one pair of rectangular pleated filter elements arranged in a V configuration having an open end, a closed end and two V-shaped ends; and
a filter frame having the at least one pair of filter elements disposed therein, said filter frame comprising a front frame sealed to the filter elements at the open end, a rear plate sealed to the filter elements at the closed end, and two side plates connected to the front and rear plates and sealed to the filter elements at the V-shaped ends;
said front frame defining at least one rectangular aperture at the open end for receiving an air flow to be filtered.

In order to secure the filter elements to the frame structure and prevent air from bypassing the filter elements, the filter elements are typically adhered and sealed against the frame structure by means of an adhesive.

During operation, air is passed from a "dirty" upstream side to a "clean" downstream side of the filter. The air to be filtered passes through the rectangular aperture defined by the front frame, and into a space upstream of the filter element(s). The air then passes through the porous filter media of the filter elements to the "clean" downstream side of the filter.

When using filters with a high degree of separation, as required for example for gas turbine applications, in wet or damp environments, substantial amounts of water will be separated from the incoming air. In order to prevent excessive build-up of water on the pleated filter media, the air filter assemblies are typically mounted with the filter elements arranged in a vertical orientation, allowing water to drain from the media surface down to the bottom of the frame structure by force of gravity. This orientation of the filter assembly is referred to as the normal operating mode. Water collected at the bottom of the frame structure is then expected to drain out through the open end of the air filter. However, due to the air flow passing through the filter, particularly in high volume air filtration applications, the water collected at the bottom of the frame structure is prevented from draining out through the open end of the filter.

In the normal operating mode, the filter assemblies are positioned with one of the side plates facing downwards during use. In some embodiments, the pleated edges of the rectangular pleated filter elements are sealed to these side plates. Having the pleated edges of the rectangular pleated filter elements sealed to the side plates, and thereby having the pleats vertically oriented during use, further improves drainage from the filter element surfaces. In some embodiments, the straight, non-pleated edges of the rectangular pleated filter elements are sealed to the other pair of opposing side plates (in the case of a panel filter or deep pleat box filter) or to the front frame and rear plate(s) (in the case of a V-type filter).

The deflector element extends alongside an edge portion of the rectangular aperture. The deflector element can either be a distinct element attached to the air filter, or it can be a portion of the front frame forming a deflector element structure.

In some embodiments, the deflector element extends in a direction substantially perpendicular to the pleat direction, i.e. the direction of the folds, of the filter element(s). The deflector element is adapted to deflect an air flow passing through the rectangular aperture away from an adjacent inside surface of the air filter. The deflector element effectively prevents the air flow passing through the filter from acting on the liquid collected at the adjacent inside surface.

Since the design of the filters often allow for installation in different orientations, e.g. vertically or horizontally and optionally flipped 180 degrees, deflector elements and liquid drains may be provided at more than one edge portion of the rectangular aperture. In some embodiments, deflector elements and liquid drains are provided at two opposing edge portions of the rectangular aperture. In some embodiments, deflector elements and liquid drains are provided at all four edge portions of the rectangular aperture.

In some embodiments, the at least one rectangular aperture of the air filter for receiving an air flow to be filtered has two opposing short sides and two opposing long sides and said deflector element extends alongside an edge portion of a short side of the rectangular aperture.

In some embodiments, in a normal operating mode, the said at least one rectangular aperture for receiving an air flow to be filtered is vertical, said deflector element extends alongside a bottom edge portion of the rectangular aperture, and said adjacent inside surface of the air filter is a bottom inside surface.

The inventive air filter assembly is especially advantageous in high air flow applications, with high filtration requirements where it is important to minimize obstructions of the air flow and resulting pressure drop. Therefore, the deflector elements are preferably arranged such that the open unobstructed cross sectional area of the rectangular aperture is kept as large as possible.

The deflector element is arranged alongside an edge portion of the rectangular aperture. This way, the obstruction of the air flow passing through the air filter caused by the deflector element can be minimized.

In a preferred embodiment, the unobstructed cross sectional area of the rectangular aperture is at least 90%, preferably at least 95%. In other words, the deflector element(s) block no more than 10%, preferably no more than 5%, of the cross sectional area of the rectangular aperture.

In order to minimize obstructions of the air flow and resulting pressure drop, the cross sectional area of the rectangular aperture is preferably free from other obstructions besides the deflector element(s).

The deflector element is preferably characterized by a flat or curved surface adapted to deflect an air flow passing through the rectangular aperture away from an adjacent inside surface of the air filter. The deflector element preferably extends along the entire length of an edge portion of the rectangular aperture, such that the air flow is deflected away from the entire width of the adjacent inside surface.

In some embodiments, the at least one deflector element comprises an elongated fixed vane having a flat or curved surface adapted to deflect an air flow passing through the rectangular aperture away from an adjacent inside surface of the air filter.

To allow the collected liquid to drain out of the filter, the inventive air filter assembly further comprises a liquid drain arranged such that liquid collected at the adjacent inside surface of the air filter can exit the air filter through said liquid drain. The liquid drain is preferably arranged in a position where the air flow is retarded due to the presence of the deflector element. The liquid drain is arranged such that the liquid can drain out of the filter without being prevented by the air flow passing through the filter.

In some embodiments, the liquid drain is arranged in the front frame under the deflector element or just behind the deflector element in the air flow direction.

In some embodiments, the liquid drain is arranged as a gap formed between the deflector element and the adjacent inside surface of the air filter, such that liquid collected at the adjacent inside surface of the air filter can exit the air filter through said liquid drain.

In preferred embodiments, the drain is arranged between said deflector element and said edge portion of the rectangular aperture, such that liquid collected at the adjacent inside surface of the air filter can exit the air filter through said liquid drain. The deflector element allows the liquid to drain out of the filter without being prevented by the air flow passing through the filter.

The liquid drain is arranged between said deflector element and said edge portion of the rectangular aperture, such that liquid collected at said adjacent inside surface of the air filter can exit the air filter through said liquid drain.

The liquid drain preferably comprises an opening between the interior and the exterior of the air filter. In some embodiments the liquid drain comprises one or more holes or slots formed between the deflector element and an edge portion of the rectangular aperture.

The deflector element may be provided as a an integrated part of the front frame of the air filter, or it can be provided separate from the air filter, for example in the form of a separate deflector frame adapted to be attached to the front frame of the air filter. The term air filter assembly is used herein to denote both an air filter having a deflector element as an integrated part of the front frame and an air filter having a deflector element which is separate from the air filter.

Thus, in some embodiments the air filter assembly is an air filter comprising:
  a front frame defining at least one rectangular aperture for receiving an air flow to be filtered by the air filter;
  a deflector element extending alongside an edge portion of the rectangular aperture and adapted to deflect an air flow passing through the rectangular aperture away from an adjacent inside surface of the air filter; and
  a liquid drain arranged such that liquid collected at said adjacent inside surface of the air filter can exit the air filter through said liquid drain.

In some embodiments, the deflector element is an integral part of the air filter. Preferably, the deflector element is an integral part of the front frame of the air filter. A front frame for an air filter having an integral deflector element and liquid drain may for example be manufactured by injection molding, machining or 3D printing techniques.

In order to minimize the adjustments required to implement deflector elements and liquid drains in existing filter installations and filter manufacturing methods, the deflector element can also be provided separate from the air filter, for example in the form of a separate deflector frame adapted to be attached to the front frame of the air filter. Thus, in some embodiments the deflector element is separate from the air filter, preferably provided on a deflector frame separate from the air filter. In an air filter assembly comprising a separate deflector element, the liquid drain can be formed in the front frame of the air filter, in a deflector frame comprising the deflector element, or simply by a distance formed between the front frame of the air filter and the deflector element or deflector frame.

The deflector element and liquid drain are preferably arranged at an edge portion of the rectangular aperture adjacent an inside surface of the air filter, which will form a bottom surface during use, since this will typically be the inner surface where the most liquid is collected.

The air filter assembly is typically arranged vertically in a filter holding structure. By vertically arranged it is meant that the pleated filter elements, and more specifically, the pleat folds, are arranged in a vertical, or substantially vertical orientation. In this arrangement, the side plates will constitute the top and bottom walls of the air filter respectively. With this arrangement, the deflector element and liquid drain are preferably arranged at an edge portion of the rectangular aperture adjacent a V-shaped end of the V-type air filter. Thus, in some embodiments, the deflector element and liquid drain is arranged at an edge portion of the rectangular aperture adjacent a V-shaped end of a V-type air filter.

Since the design of the filters often allow for installation in different orientations, e.g. vertically or horizontally and optionally flipped 180 degrees, deflector elements and liquid drains may be provided at more than one edge portion of the rectangular aperture. In some embodiments, deflector elements and liquid drains are provided at two opposing edge portions of the rectangular aperture. In some embodiments, deflector elements and liquid drains are provided at all four edge portions of the rectangular aperture.

In some embodiments, deflector elements and drains are provided at both opposing edge portions of the rectangular aperture adjacent opposing V-shaped ends of a V-type air filter.

In some embodiments, the adjacent inside surface of the air filter is inclined, such that liquid collected at said adjacent inside surface will be urged by force of gravity towards the open end of the air filter. A slight inclination downwards, from the closed end towards the open end of the air filter is typically useful to facilitate drainage, even with the deflector element in place. However, it is noted that with the deflector element, an acceptable drainage can be achieved also with a lower incline. A lower incline is desirable as it allows for the available filter media area to be increased, allowing for a reduction of the overall pressure drop.

The deflector element and liquid drain of the inventive air filter assembly help drain liquid from the interior of the filter during operation. In some embodiments, the liquid drained from the filter is simply allowed to flow freely down to the bottom of the filter housing and further drained from there. However, in some cases, particularly where several air filter assemblies are arranged above each other, it may be preferred to collect and drain the liquid from each filter individually, to prevent liquid drained from one filter from immediately entering the filter below. It is understood that the liquid load on a filter located at the bottom of a stack could otherwise become very high.

In order to address this problem, the air filter assembly in some embodiments further comprise a liquid collection system configured to receive liquid which exits the air filter through the liquid drain. The liquid collection system may for example comprise piping or open drains adapted to receive liquid collected from one or more filters and divert the liquid away from the filters below.

The liquid collection system may be provided as an integrated part of the front frame of the air filter, or it can be provided separate from the air filter. The term air filter assembly is used herein to denote both an air filter having a liquid collection system as a an integrated part of the front frame and an air filter having a liquid collection system which is separate from the air filter.

In some embodiments, the liquid collection system is an integral part of the air filter. Preferably, the liquid collection system is an integral part of the front frame of the air filter. A front frame for an air filter having an integral deflector element, liquid drain and a liquid collection system may for example be manufactured by injection molding, machining or 3D printing techniques.

In order to minimize the adjustments required to implement a liquid collection system in existing filter installations and filter manufacturing methods, the liquid collection system can be provided separate from the air filter. Thus, in some embodiments the liquid collection system is separate from the air filter. The liquid collection system may for example be provided on a filter holding structure, such as a filter housing or filter bank grid, with one or more openings in which the air filter(s) are fitted. This way, the filters can be replaced independently of the liquid collection system.

In embodiments, wherein the deflector element is provided in a deflector frame separate from the air filter, the liquid collection system can be provided in the deflector frame.

According to a second aspect of the disclosure, there is provided a deflector frame for an air filter, said deflector frame defining at least one rectangular aperture for receiving an air flow to be filtered by the air filter, said deflector frame comprising:
  at least one deflector element extending along an edge portion of the rectangular aperture and adapted to deflect an air flow passing through the rectangular aperture away from an adjacent inside surface of an air filter; and
  at least one liquid drain arranged such that liquid collected at said adjacent inside surface of an air filter can exit the air filter through said liquid drain.

The deflector frame allows the liquid to drain out of the filter without being prevented by the air flow passing through the filter. To allow the collected liquid to drain out of the filter, the deflector frame comprises or together with the air filter forms a liquid drain arranged such that liquid collected at the adjacent inside surface of the air filter can exit the air filter through said liquid drain. The liquid drain is arranged such that the liquid can drain out of the filter without being prevented by the air flow passing through the filter.

In some embodiments, the liquid drain is arranged in the deflector frame under the deflector element or just behind the deflector element in the air flow direction.

In some embodiments, the liquid drain is arranged as a gap formed between the deflector frame and the adjacent inside surface of the air filter, such that liquid collected at the adjacent inside surface of the air filter can exit the air filter through said liquid drain.

In preferred embodiments, the drain is arranged between said deflector element and said edge portion of the rectangular aperture, such that liquid collected at the adjacent inside surface of the air filter can exit the air filter through said liquid drain.

The deflector frame and liquid drain of the deflector frame may be further defined as set out above with reference to the air filter assembly.

In some embodiments, the deflector frame further comprises a liquid collection system configured to receive liquid which exits the air filter through said liquid drain.

As described above, the inventive air filter assembly is particularly useful for filtration of air in wet or damp conditions. Thus, according to a third aspect of the disclosure, there is provided the use of an air filter assembly as described herein with reference to the first aspect, for filtration of air in wet or damp conditions.

During the use, the air filter assembly is preferably arranged such that the at least one rectangular aperture for receiving an air flow to be filtered is vertical, said deflector element extends alongside a bottom edge portion of the rectangular aperture, and said adjacent inside surface of the air filter is a bottom inside surface.

Various embodiments of the invention will now be described more in detail with reference to the drawings.

BRIEF DESCRIPTION OF THE DRAWINGS

Referring now to the drawings, which are exemplary embodiments, and wherein.

DETAILED DESCRIPTION OF PREFERRED EMBODIMENTS

The air filter assembly will be further described with reference to an embodiment in which the air filter is a V-type air filter. However, it should be understood that the the air filter could also be a panel filter or a deep pleat box filter.

Figure 1:
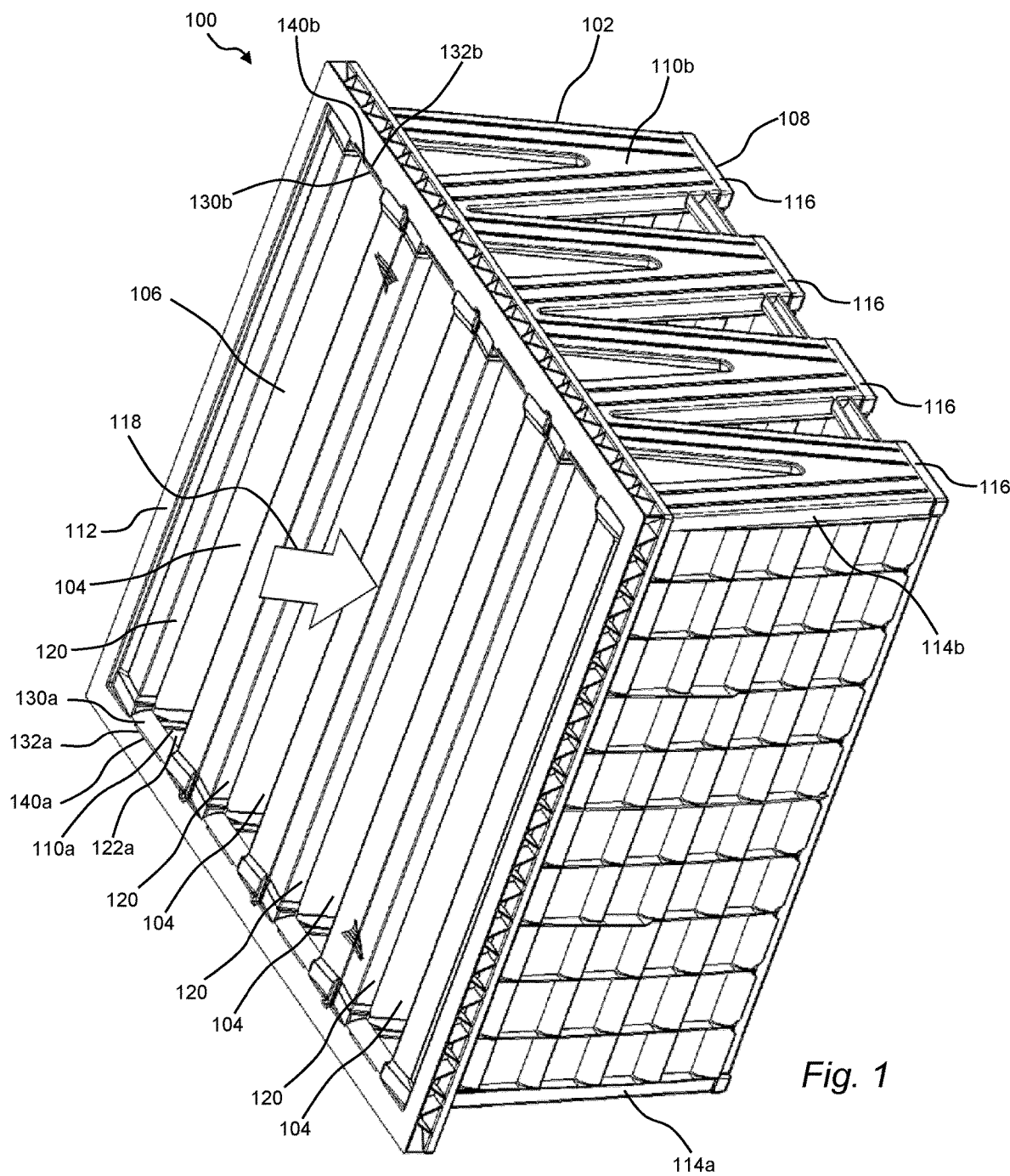
FIG. 1 is a perspective view of an embodiment of the inventive air filter.

The V-type air filter 100, shown in FIG. 1 comprises a filter frame 102, and several, in this embodiment eight, rectangular pleated filter elements 104 carried by the filter frame 102. The filter elements 104 are arranged in pairs in a V configuration having an open end 106, a closed end 108 and two V-shaped ends 110a, 110b. Although the invention will be described mainly with reference to a 4V embodiments, it is understood that the invention is equally applicable to 1V, 2V, 3V or more V configurations, i.e. filter assemblies comprising 2, 4, 6, or more filter elements. The filter elements can be of any suitable kind, but typically each filter element comprises a sheet of filter media, which has been pleated to an accordion shape in order to increase the effective filtering area of the filter body.

Although the filter is shown having pleated filter elements, it is contemplated that the filter elements may be comprised of carbon beds or other gas phase filter medium. The filter element may be suitable for at least one of liquid phase, gas phase, particulate or molecular filtration. In one embodiment, the filter element may be a molecular filtration media, such as bed of carbon or other gas phase absorber.

The filter frame 102 comprises a front frame 112, here in the form of a front plate, two side plates 114a, 114b and a rear plate 116, embodied by four separate plate elements. In order to secure the filter elements 104 to the frame structure 102 and prevent air from bypassing the filter elements, the filter elements are adhered and sealed against the frame structure by means of an adhesive. The front frame 112 is sealed to the filter elements at the open end 106, the rear plate elements 116 are sealed to the filter elements at the closed end 108, and the two side plates 114a, 114b are connected to the front and rear plates and sealed to the filter elements at the V-shaped ends 110a, 110b.

The pleated filter elements 104 are arranged such that the pleated zig-zag edges of the rectangular pleated filter elements are sealed to the side plates 114a, 114b, and the straight edges of the rectangular pleated filter elements 104 are sealed to the front frame 112 and rear plate(s) 116 respectively.

V-type air filters are provided in a wide variety of sizes. A common type has a substantially square front frame of about 600×600 mm. The height of the front frame may vary, but is often 20 mm or 25 mm.

The air flow direction through the filter is indicated by arrow 118. The direction of the arrow is orientated as V-type filters are typically utilized.

The front frame of the V-type air filter assembly defines four rectangular apertures 120 for receiving the air flow to be filtered. Each rectangular aperture 120 corresponds to the open end 106 of one of the pairs of filter elements arranged in a V configuration.

During operation, air to be filtered is passed in the direction of the arrow 118 from a "dirty" upstream side to a "clean" downstream side of the filter. The air to be filtered passes through a rectangular aperture 120 defined by the front frame 112, and into a V-shaped upstream space defined by the pair of filter elements 104 forming a V-shape, and the opposing side plates 114a, 114b at the V-shaped ends 110a, 110b of the space. The air then passes through the porous filter media of the filter elements 104 to the "clean" downstream side of the filter.

During operation of the filter in wet or damp environments, substantial amounts of water will be separated from the incoming air, accumulate on the surfaces of the filter elements 104, and eventually trickle down to the V-shaped bottom 122a of the frame structure by force of gravity. Water collected at the bottom of the V is then expected to drain out through the open end 106 of the filter.

The front frame 112 of the V-type air filter assembly 100 further comprises a deflector element 130a extending alongside an edge portion 132a of the rectangular aperture 120 and adapted to deflect an air flow passing through the aperture 120 away from an adjacent inside surface 122a of the V-type air filter. In this embodiment, the deflector element 130a is an integral part of the front frame 112 of the V-type air filter. The deflector element 130a has the form of an elongated fixed vane having a curved surface adapted to deflect an air flow passing the deflector element away from an adjacent inside surface of the V-type air filter.

The front frame 112 of the V-type air filter assembly further comprises a second deflector element 130b, provided at the opposing edge portion 132b of the rectangular aperture 120 adjacent the opposing V-shaped ends 122b of the V-type air filter. This allows for the filter assembly 100 to be mounted with either side plate (114a or 114b) as the bottom side plate.

The unobstructed cross sectional area of the rectangular aperture is at least 95%. In other words, the deflector elements block no more than 5%, of the cross sectional area of the rectangular aperture. In order to minimize obstructions of the air flow and resulting pressure drop, the cross sectional area of the rectangular aperture is free from other obstructions besides the deflector element(s).

A liquid drain 140a, 140b in the form of a slot is arranged between each deflector element 130a, 130b and the corresponding edge portion 132a, 132b of the rectangular aperture 120, such that liquid collected at said adjacent inside surface 122a or 122b of the V-type air filter can exit the V-type air filter through the liquid drain 140a, 140b.

The inside surface 122a, 122b of the V-type air filter is slightly inclined, such that liquid collected at said adjacent inside surface will be urged by force of gravity towards the open end 106 of the V-type air filter.

Figure 2:
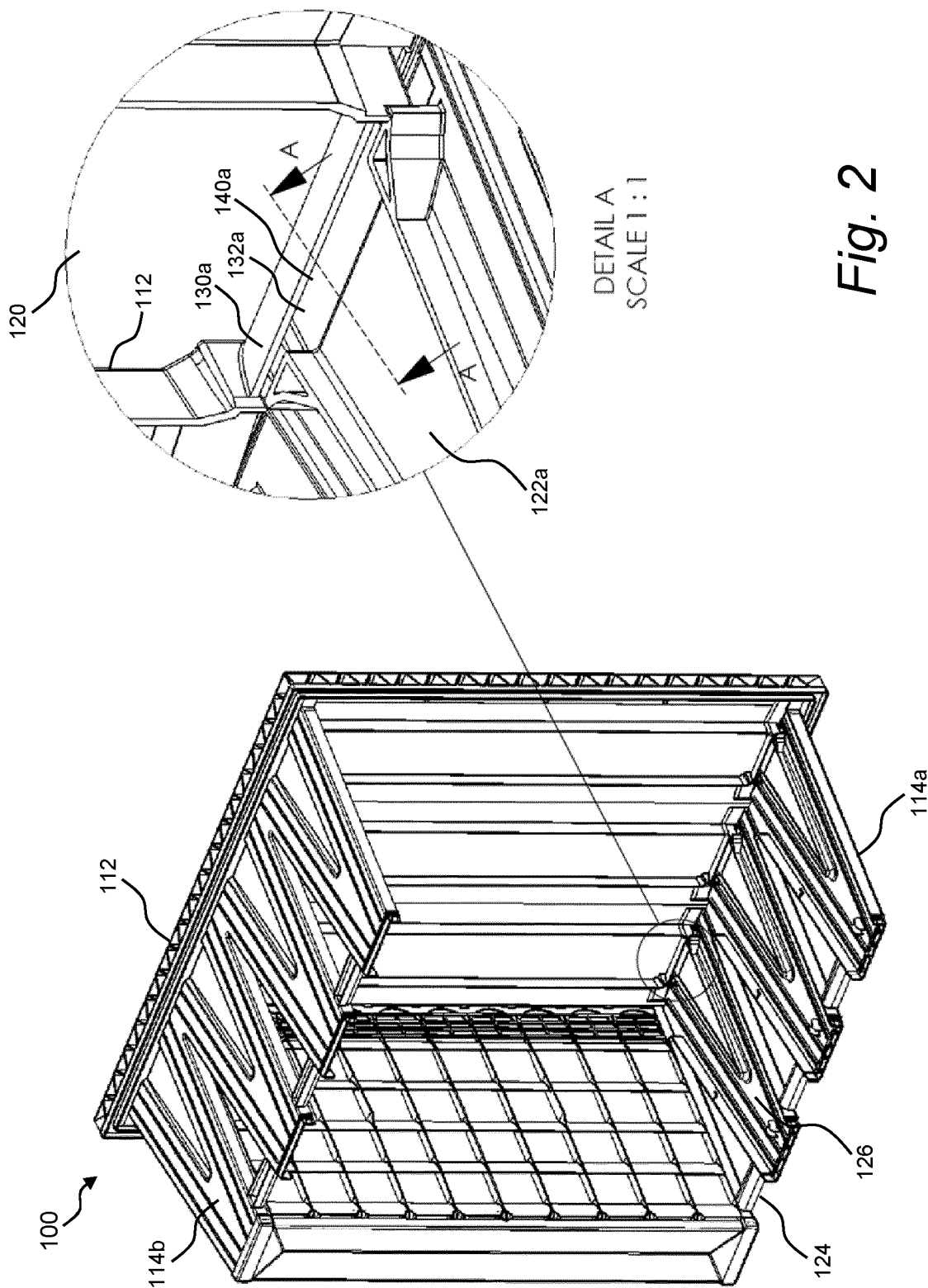
FIG. 2 is a perspective view of a partially assembled embodiment of the inventive air filter and a magnified view of the position of the deflector element.

FIG. 2 depicts partially assembled embodiment of the inventive V-type air filter 100 with three of the pairs of filter elements removed. The partial magnified view shows the position of the deflector element 130a.

The deflector element 130a extends alongside an edge portion 132a of the rectangular aperture 120 and is adapted to deflect an air flow passing through the rectangular aperture away from the adjacent inside surface 122a of the V-type air filter. In this embodiment, the deflector element 130a is an integral part of the front frame 112 of the V-type air filter. The deflector element 130a has the form of an elongated fixed vane having a curved surface adapted to deflect an air flow passing the deflector element away from the adjacent inside surface of the V-type air filter.

The front frame 112 is rectangular and comprises a peripherally extending rim, and parallel troughs extending between opposite rim sides of the front frame. The front frame 112 is formed in a single piece, having a first coupling portion configured to receive the front edge portion of the first side plate 114a, and a second coupling portion configured to receive the front edge portion of the second side plate 114b.

The side plates 114a, 114b are arranged at the opposite rim sides of the front frame 112. The side plates include an exterior side and an interior side. Each side plate extends perpendicular to the front frame, and rearwards therefrom. The filter elements 104 are plate shaped and extend obliquely substantially in the direction of the air flow from the front frame 112, although they extend close to perpendicular to the front frame. The filter elements are arranged side by side, leaning alternately to one side and to the other side. More particularly, they are arranged in pairs, each pair forming a V shape, such that the mouth of the V shape faces the front frame 112. A front edge of each filter element is received in one of the troughs, and apertures between the troughs are aligned with the mouths of the V shapes. Each side plate 114a, 114b has four V-shaped portions extending between the front edge portion and an opposite rear edge portion of the side plate, with the mouth of each V-shaped portion facing the front edge portion.

Reinforcing elements 124 may be provided extending between adjacent V-shaped portions to further increase the structural rigidity of the side plates 114a, 114b. These reinforcing elements can also serve as handles when handling the side plates or (semi-) assembled filter frame assemblies. Each V-shaped portion is defined by a channel, having side walls. Each V-shaped channel 126 is adapted to receive side edge portions, of two filter elements 104. Of course, it is also possible for the side plates to have more or less than four V-shaped portions, such as one, two, three or more. Also, the side plates may not have V-shaped portions at all but may for example be provided in the form of a cover having a rectangular or trapezoidal shape or similar without openings between adjacent pairs of filter elements. Each plate element of the rear plate 116 covers rear edge portions of two filter elements forming a V-shape. The pleated filter elements 104 are arranged such that the pleated zig-zag edges of the rectangular pleated filter elements are sealed to the side plates 114a, 114b, and the straight edges of the rectangular pleated filter elements 104 are sealed to the front frame 112 and rear plate(s) 116 respectively. Consequently, the front frame, the side plates, and the rear plate support each other to form a strong filter frame, which carries the filter elements.

Figure 3:
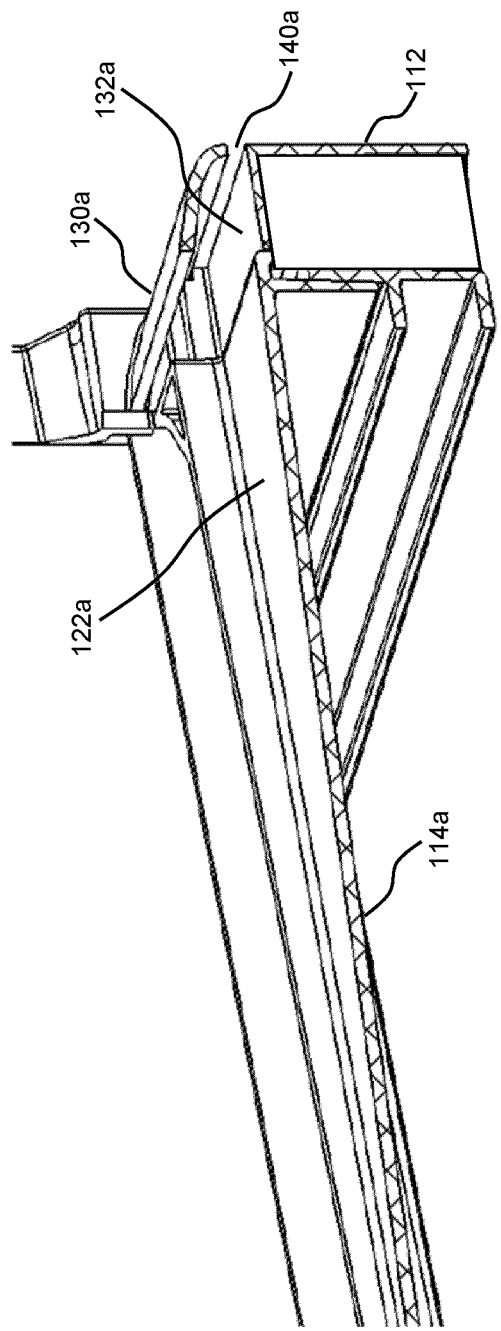
FIG. 3 is a cross sectional view of the deflector element and liquid drain.

FIG. 3 is a cross sectional view of the deflector element and liquid drain. The deflector element 130a extends alongside an edge portion 132a of the rectangular aperture 120 and is adapted to deflect an air flow passing through the rectangular aperture away from the adjacent inside surface 122a of the V-type air filter. In this embodiment, the deflector element 130a is an integral part of the front frame 112 of the V-type air filter. The deflector element 130a has the form of an elongated fixed vane having a curved surface adapted to deflect an air flow passing the deflector element away from an adjacent inside surface of the V-type air filter.

The liquid drain 140a in the form of a slot is arranged between said deflector element 130a and said edge portion 132a of the rectangular aperture 120, such that liquid collected at said adjacent inside surface 122a of the V-type air filter can exit the V-type air filter through the liquid drain 140a.

Figure 4A:
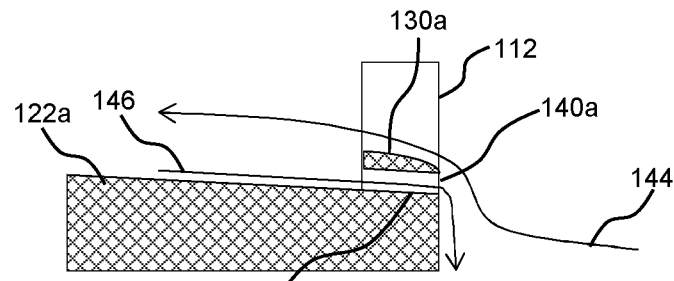
FIG. 4a-4c is a schematic cross-sectional view of various deflector element and liquid drain configurations.
Figure 4B:
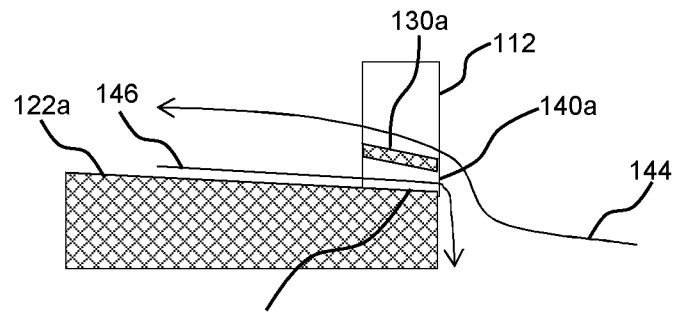
Figure 4C:
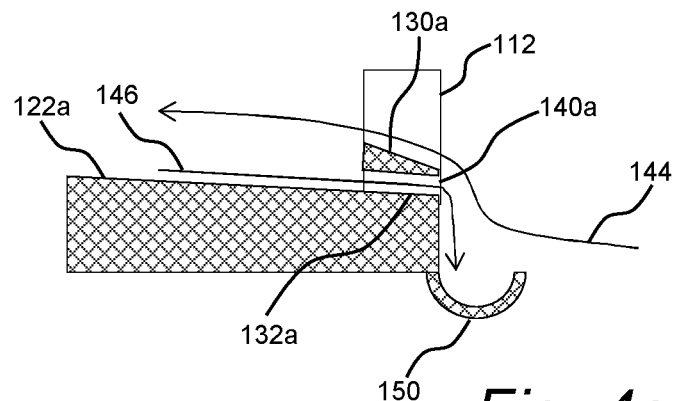

FIG. 4a-4c show different configurations of the deflector element 130a and liquid drain 140a in the front frame 112 of the V-type filter. Arrow 144 illustrates the deflected air flow and arrow 146 illustrates the draining water. FIG. 4c also includes an optional liquid collection system 150 configured to receive liquid which exits the V-type air filter through said liquid drain 140a.

In an alternative embodiment (not shown), the deflector element is arranged on the front side of the front frame and the liquid drain is arranged as a gap formed between the deflector element and the adjacent inside surface of the air filter, such that liquid collected at the adjacent inside surface of the air filter can exit the air filter through said liquid drain.

Figure 5A:
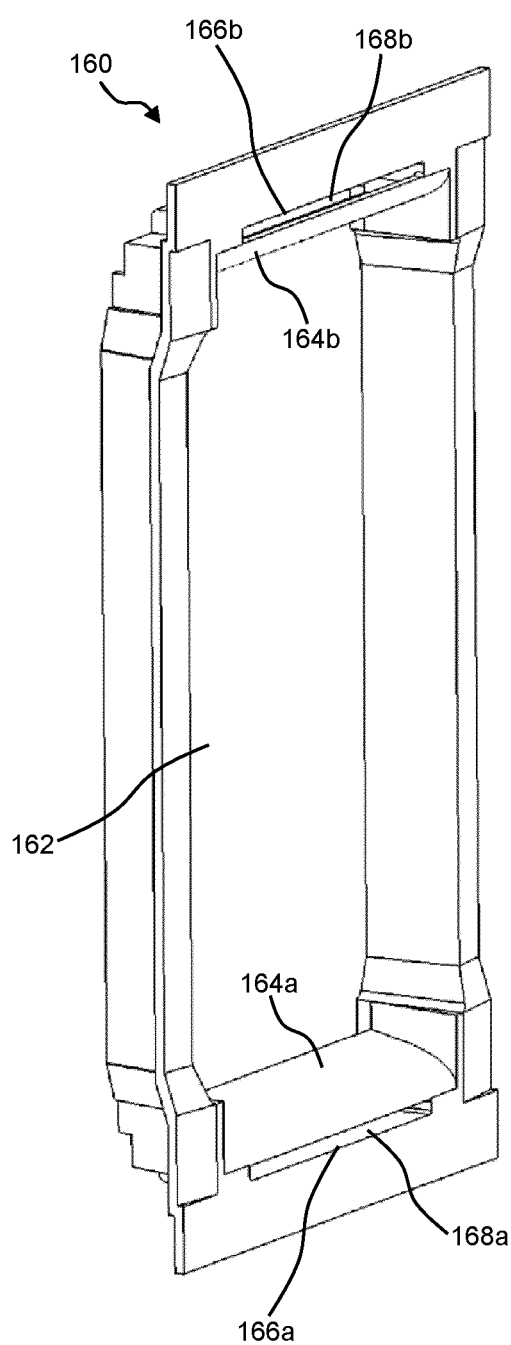
FIG. 5a is a perspective view of an embodiment of the inventive deflector frame.
Figure 5B:
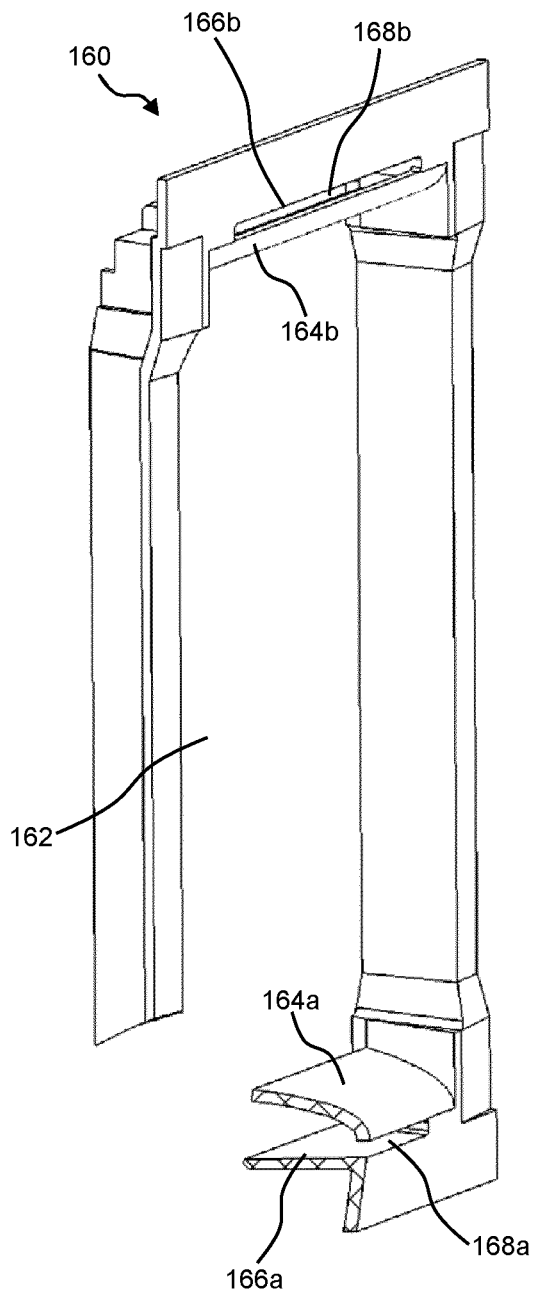
FIG. 5b is a cross sectional view of the deflector element and liquid drain of the inventive deflector frame.

FIGS. 5a and 5b depict a separate deflector frame 160 for attachment to the front frame of a V-type air filter which does not have a deflector element and liquid drain. The deflector frame 160 defines a rectangular aperture 162 configured to correspond to a rectangular aperture of the V-type air filter. The deflector frame 160 further comprises a deflector element 164a extending alongside an edge portion 166a of the rectangular aperture 162 and adapted to deflect an air flow passing through the rectangular aperture away from an adjacent inside surface of a V-type air filter to which the deflector frame 160 is attached. The deflector element 164a has the form of an elongated fixed vane having a curved surface adapted to deflect an air flow passing the deflector element away from an adjacent inside surface of a V-type air filter.

The deflector frame 160 further comprises a second deflector element 164b, provided at the opposing edge portion 166b of the rectangular aperture 162 adjacent the opposing V-shaped ends of the V-type air filter.

A liquid drain 168a, 168b in the form of a slot is arranged between the deflector element 164a, 164b and the edge portion 166a, 166b of the rectangular aperture 162, such that liquid collected at an adjacent inside surface of a V-type air filter can exit the V-type air filter through the liquid drain.

The deflector frame 160 can be attached to the front frame of a V-type air filter using for example a snap lock or clamping functionality (not shown).

Figure 6A:
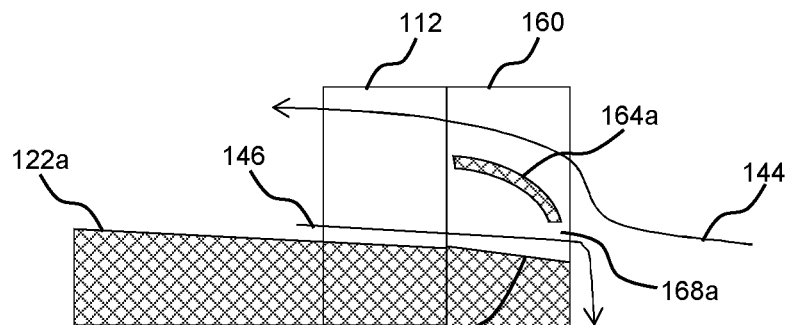
FIG. 6a-6c is a schematic cross-sectional view of various deflector element and liquid drain configurations with a deflector frame.
Figure 6B:
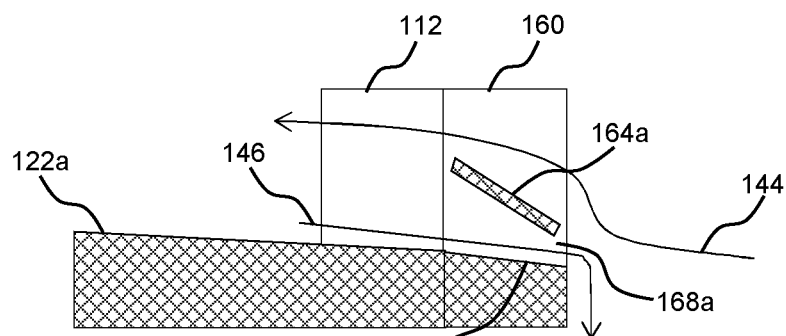
Figure 6C:
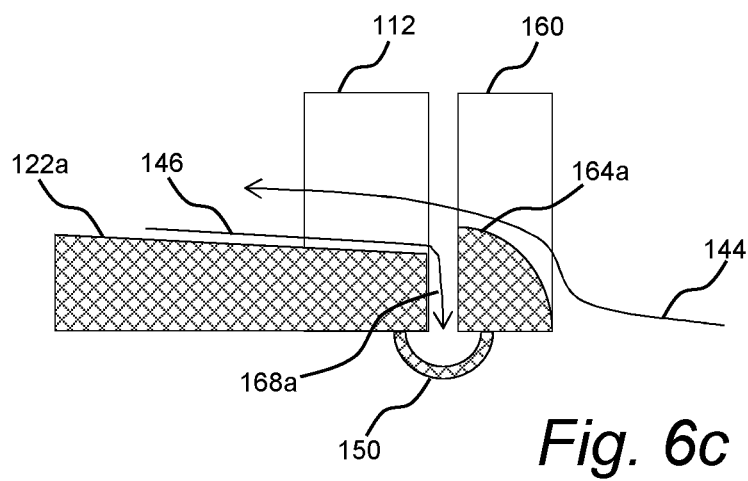

FIG. 6a-6c show different configurations of the deflector element 164a and liquid drain 168a in the deflector frame 160. Arrow 144 illustrates the deflected air flow and arrow 146 illustrates the draining water. In FIGS. 6a and 6b, the deflector element 164a and liquid drain 168a are both included in the deflector frame. In FIG. 6c, the deflector element 164a is included in the deflector frame, but the liquid drain 168a is formed by a spacing between the deflector frame 160 and the front frame 170 of the V-type air filter. FIG. 6c also includes an optional liquid collection system 150 configured to receive liquid which exits the V-type air filter through the liquid drain.

Figure 7A:
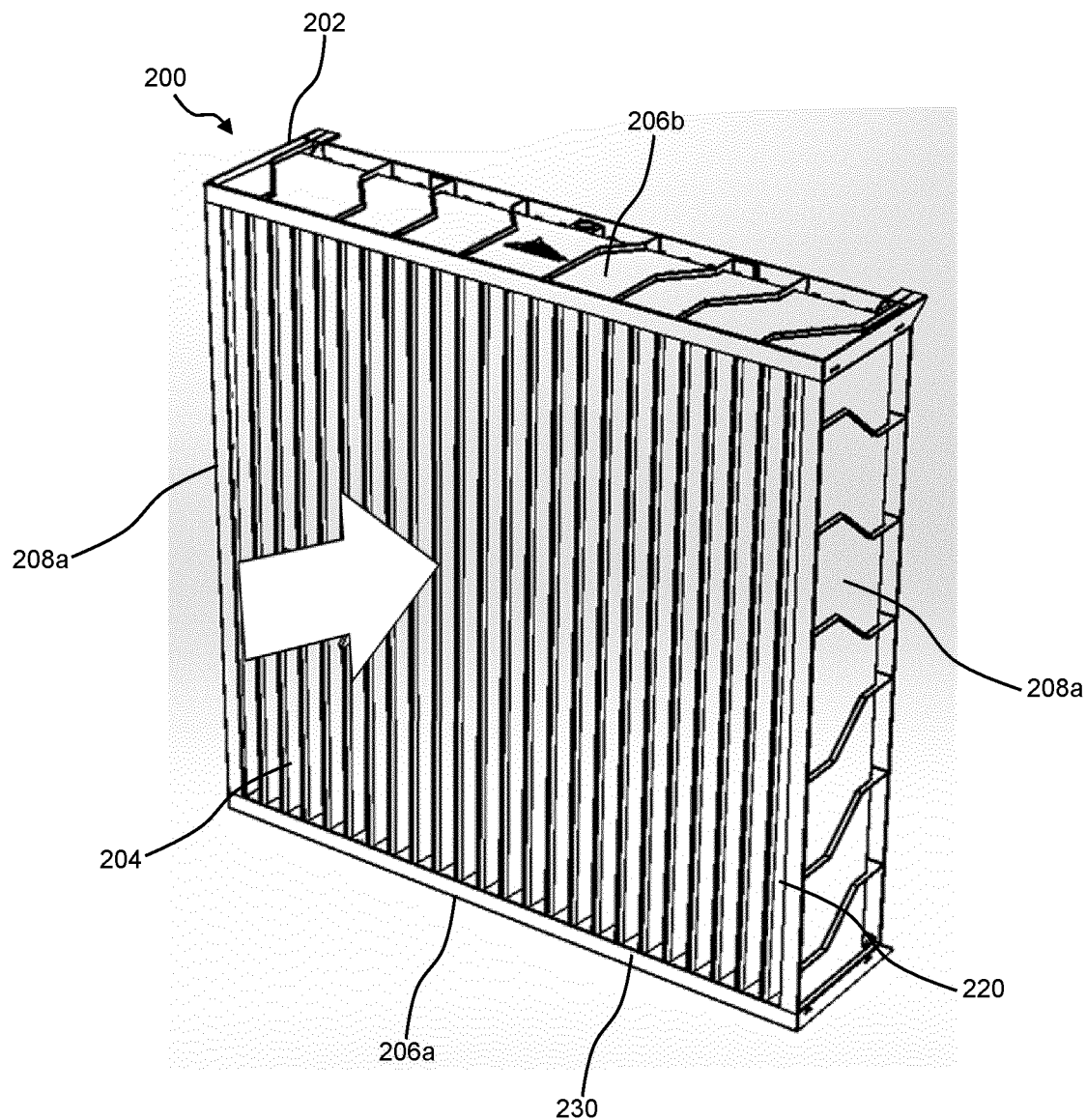
FIG. 7a is a perspective view of an embodiment of the inventive air filter.

FIG. 7a shows an alternative embodiment in which the air filter is a panel filter. The panel filter 200 has a rectangular pleated filter element 204 and a rectangular filter frame 202 having the pleated filter element 204 disposed therein. The filter frame 202 includes a first pair of opposing side plates 206a, 206b sealed to the pleated edges of the rectangular pleated filter element and a second pair of opposing side plates 208a, 208b sealed to the non-pleated edges of the rectangular pleated filter element. The rectangular filter frame 202 forms a front frame 212 (not shown) defining a rectangular aperture 220 for receiving an air flow to be filtered. The panel filter 200 is provided with a deflector element 230 and a liquid drain (not shown) between the deflector element 230 and the front frame 212.

Figure 7B:
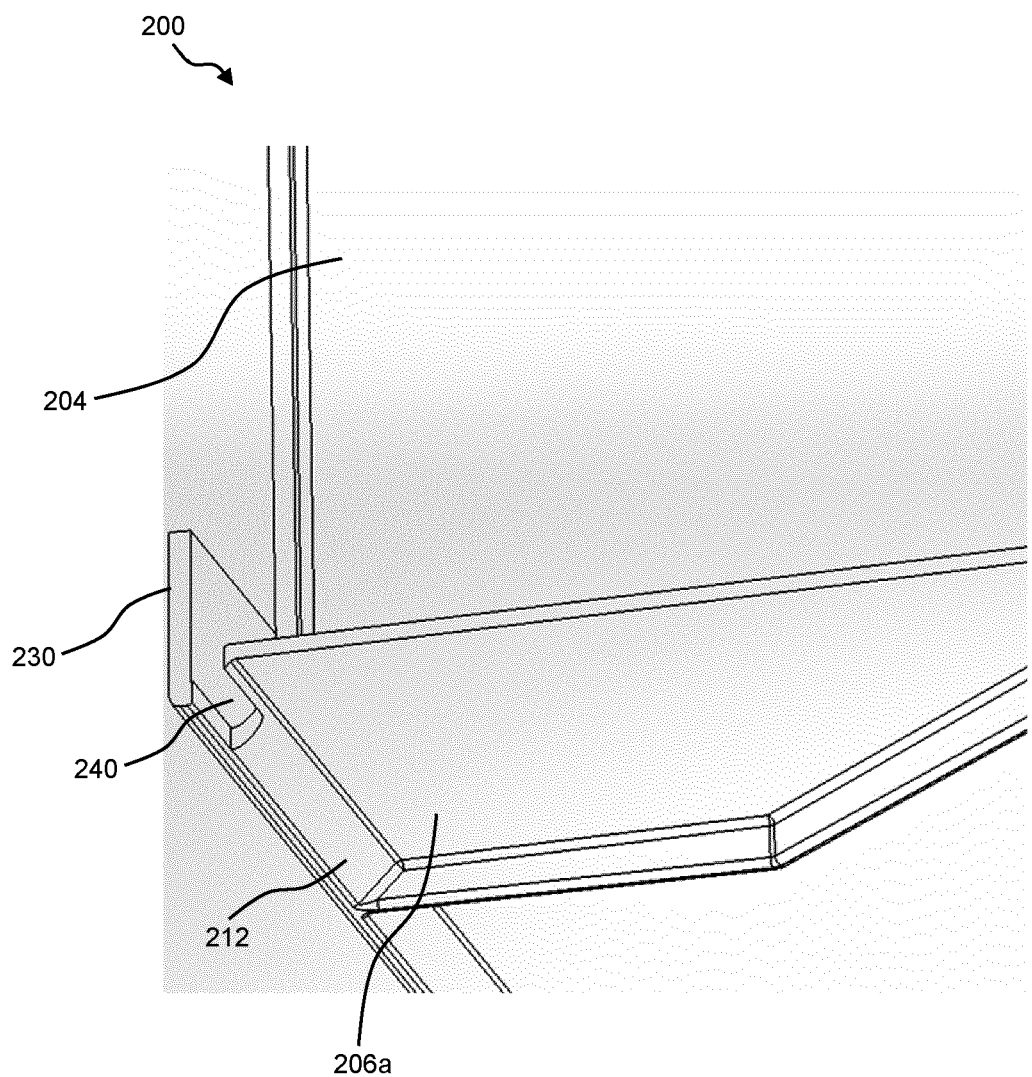
FIG. 7b is a cross sectional view of the air filter of FIG. 7a showing the deflector element and liquid drain.

FIG. 7b is a cross-sectional view of the panel filter 200 of FIG. 7a showing the deflector element 230 and the liquid drain 240. The deflector element 230 is arranged on the front side of the front frame 212 and the liquid drain 240 is arranged as a gap formed in the front frame 212 between the deflector element 230 and the adjacent inside surface of the air filter, such that liquid collected at the adjacent inside surface of the air filter can exit the air filter through said liquid drain.

While the invention has been described herein with reference to various exemplary embodiments, it will be understood by those skilled in the art that various changes may be made, and equivalents may be substituted for elements thereof, without departing from the scope of the invention. In addition, many modifications may be made to adapt a particular situation or feature to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, it would be understood by the person skilled in the art what features of the different embodiments can be combined although not explicitly written above.

The invention claimed is:

1. An air filter assembly comprising:
an air filter comprising a front frame having a front surface defining at least one rectangular aperture for receiving an air flow to be filtered, wherein said air filter is a panel filter, a deep pleat box filter, or a V-type filter, wherein said air filter comprises at least one rectangular pleated filter element, and wherein said air filter conforms to a filtration class from G4 up to H13 according to the standards EN779 or EN1822
a deflector element extending alongside the front surface at an edge portion of the front frame and adapted to deflect an air flow passing in through the rectangular aperture away from an adjacent inside surface of the air filter; and
a liquid drain formed between said deflector element and the front frame such that liquid collected along an inside surface of the air filter flows out the air filter through said liquid drain along the front frame and out the rectangular aperture at the front surface.

2. The air filter assembly according to claim 1, wherein, when said air filter is a panel filter or a deep pleat box filter, the air filter assembly further comprises:
a rectangular filter frame having the at least one pleated filter element disposed therein, said rectangular filter frame comprising a first pair of opposing side plates sealed to pleated edges of the rectangular pleated filter element and a second pair of opposing side plates sealed to non-pleated edges of the rectangular pleated filter element, said rectangular filter frame forming the front frame defining the rectangular aperture at an open end for receiving an air flow to be filtered.

3. The air filter assembly according to claim 1, wherein said air filter is a V-type filter comprising:
at least one pair of rectangular pleated filter elements arranged in a V configuration having an open end, a closed end and two V-shaped ends; and
a filter frame having the at least one pair of filter elements disposed therein, said filter frame comprising the front frame which is sealed to the filter elements at the open end, a rear plate sealed to the filter elements at the closed end, and two side plates connected to front and rear plates and sealed to the filter elements at the V-shaped ends;
said front frame defining the at least one rectangular aperture at the open end for receiving an air flow to be filtered.

4. The air filter assembly according to claim 1, wherein the deflector element extends in a direction perpendicular to a pleat direction of the filter element(s).

5. The air filter assembly according to claim 1, wherein said at least one rectangular aperture for receiving an air flow to be filtered has two opposing short sides and two opposing long sides and said deflector element extends alongside an edge portion of a short side of the rectangular aperture.

6. The air filter assembly according to claim 1, wherein in a normal operating mode: the said at least one rectangular aperture for receiving an air flow to be filtered is vertical; the said deflector element extends alongside a bottom edge portion of the rectangular aperture; and the said adjacent inside surface of the air filter is a bottom inside surface.

7. The air filter assembly according to claim 2 or 3, wherein the pleated edges of the at least one rectangular pleated filter element are sealed to the side plates.

8. The air filter assembly according to claim 1, wherein said deflector element is an integral part of the air filter.

9. The air filter assembly according to claim 1, wherein said deflector element is separate from the air filter.

10. The air filter assembly according to claim 9, wherein said deflector element is provided on a deflector frame separate from the air filter.

11. The air filter assembly according to claim 1, wherein said deflector element comprises:
   an elongated fixed vane having a flat or curved surface adapted to deflect an air flow passing away from the adjacent inside surface of the air filter.

12. The air filter assembly according to claim 1, wherein in a normal operating mode said adjacent inside surface of the air filter is inclined, such that liquid collected at said adjacent inside surface will be urged by force of gravity towards an open end of the air filter.

13. The air filter assembly according to claim 1, further comprising:
   a liquid collection system configured to receive liquid which exits the air filter through said liquid drain.

14. The air filter assembly according to claim 13, wherein said liquid collection system is provided in a deflector frame separate from the air filter.

15. A deflector frame for an air filter, wherein said air filter is a panel filter, a deep pleat box filter, or a V-type filter, wherein said air filter includes at least one rectangular pleated filter element, and wherein said air filter conforms to a filtration class from G4 up to H13 according to the standards EN779 or EN1822, said deflector frame having a front surface defining at least one rectangular aperture for receiving an air flow to be filtered by the air filter, said deflector frame comprising:
   at least one deflector element extending along the front surface at an edge portion of the at least one rectangular aperture and adapted to deflect an air flow passing through the at least one rectangular aperture away from an adjacent inside surface of the air filter; and
   at least one liquid drain arranged between said deflector element and the deflector frame, the liquid drain extending out the at least one rectangular aperture, such that liquid collected at said adjacent inside surface of the air filter can exit the air filter through said liquid drain and out the rectangular aperture at the front surface.

16. The deflector frame according to claim 15, further comprising a liquid collection system configured to receive liquid which exits the air filter through said liquid drain.

17. The air filter assembly according to claim 1, wherein the air filter assembly is configured to be used for filtration of air in wet or damp conditions.

18. The air filter assembly according to claim 17, wherein said at least one rectangular aperture for receiving an air flow to be filtered is vertical, said deflector element extends alongside a bottom edge portion of the rectangular aperture, and said adjacent inside surface of the air filter is a bottom inside surface.

19. An air filter assembly suitable for use in a gas turbine combustion system, the air filter assembly comprising:
   an air filter comprising a front frame having a front surface defining at least one rectangular aperture for receiving an air flow to be filtered, wherein said air filter is a panel filter, a deep pleat box filter, or a V-type filter, wherein said air filter comprises at least one rectangular pleated filter element, and wherein said air filter conforms to a filtration class from G4 up to H13 according to the standards EN779 or EN1822, and wherein the front surface of the front frame is upstream of the at least one rectangular pleated filter element;
   a deflector element frame extending alongside and in front of the rectangular aperture, the deflector element frame having deflector elements adapted to deflect an air flow passing into the rectangular aperture away from an adjacent inside surface of the air filter; and
   a liquid drain arranged between said deflector element frame and the front frame such that liquid collected at the air filter can exit the air filter through said liquid drain and out the front surface between the rectangular aperture and the deflector element frame.

\* \* \* \* \*